3,776,937
Patented Dec. 4, 1973

3,776,937
PROCESS FOR THE MANUFACTURE OF
AROMATIC NITRILES
Abraham P. Gelbein, Plainfield, N.J., assignor to The
Lummus Company, Bloomfield, N.J.
No Drawing. Filed June 23, 1972, Ser. No. 265,956
Int. Cl. C07c 121/12, 121/56
U.S. Cl. 260—465 B                               4 Claims

ABSTRACT OF THE DISCLOSURE

In the production of aromatic polynitriles having at least one pair of nitrile groups in the ortho position relative to each other by the reaction of an alkyl aromatic hydrocarbon with ammonia, the problem of imide formation can be at least partially resolved by passing the product stream of the reaction over a dehydration catalyst to convert imides present to additional nitrile product. If necessary, additional ammonia can be added.

BACKGROUND OF THE INVENTION

This invention relates to an improvement in a process for producing aromatic polynitriles having at least one pair of nitrile groups in the ortho position relative to each other. The most commonly encountered member of this group is phthalonitrile. Another important nitrile is pyromellitonitrile (1,2,4,5-dicyanobenzene), which has two pairs of ortho-nitrile groups, and is useful in the manufacture of semiconductors. Other members of this class include trimellitonitrile (1,2,4 - tricyanobenzene), hexacyanobenzene and the several dicyanonaphthalenes.

Phthalonitrile is usually produced by the reaction of ortho-xylene with ammonia and oxygen in the presence of a catalyst (generally referred to as ammoxidation). Alternatively, the process can be carried out in the substantial absence of free oxygen using a catalyst which also serves as an oxygen transfer agent (sometimes referred to as ammonolysis or ammoniation, see e.g. U.S. Patent 3,479,385 and British patent specification 1,265,786). In either case, the reaction usually produces substantial amounts of by-products, which must be separated from the nitrile. The effluent from the production of phthalonitrile, for instance, will contain appreciable amounts of phthalimide and o-tolunitrile as well as excess ammonia, unreacted o-xylene, oxygen, nitrogen (if air was used), and carbon oxides.

The major use of phthalonitrile is as a chemical intermediate, particularly in the production of phthalocyanine and other dyes and pigments. Other members of this group of nitriles can be used as starting materials for the manufacture of semiconductors and polyesters. Consequently, high purity is an important factor in the production of these nitriles; such impurities as phthalimide must be removed from the product nitrile, otherwise they may interfere with the further use of the nitrile, or produce undesirable or difficulty separable by-products in subsequent conversions.

Separation of phthalimide from the reaction products is a problem which has long confronted the industry, and, as described below, numerous solutions have already been proposed. In the production of pyromellitonitrile, two imides are possible—the mono- and di-imide, as well as a mixture of nitriles. These imides are high melting and high boiling materials which are difficult to separate from the nitriles by conventional fractionation techniques.

Prior art

Generally, two approaches have been taken to overcome problems caused by the presence of imides in the reaction product. One has been to prevent their information, if possible, such as by choice of a catalyst or reaction conditions which favor nitrile formation and decrease imide formation (see e.g. U.S. Patents 3,278,573; 3,246,028 and 3,312,710). The other approach has been to separate out the imide from the nitrile product, by means such as vacuum distillation (U.S. Patent 3,206,-378) or by conversion to alkali-soluble materials by spraying with water (U.S. Patent 2,323,836). Of course, both approaches can be used in combination.

The primary object of the present invention is to produce aromatic ortho-, di- and polynitriles having a low imide content.

Another object of this invention is to convert imide by-products into the desired nitrile product.

Particular objects of this invention are the production of phthalonitrile and pyromellitonitrile substantially free of imides.

Of course, it is desirable to achieve the above objects at minimum cost and power usage.

Other objects and advantages of this invention will be readily apparent from this specification.

SUMMARY OF THE INVENTION

In brief, the invention comprises contacting the gaseous effluent from a process for producing an aromatic polynitrile having at least one pair of nitrile groups in the ortho position relative to each other by reaction of an alkyl aromatic hydrocarbon with ammonia in the presence of a catalyst, with a suitable dehydration catalyst, in the presence of added ammonia if necessary, to convert contained imide compounds to the desired nitrile.

Detailed description of the invention

The following description, for sake of convenience, is phrased in terms of the application of this invention to the production of phthalonitrile from o-xylene. However, as pointed out above, it is equally applicable to the production of other aromatic ortho-, di- and polynitriles, such as pyromellitonitrile and trimellitonitrile from the corresponding methyl- and ethyl-substituted aromatic hydrocarbons.

The effluent from the phthalonitrile reactor contains as the major components phthalonitrile, unreacted o-xylene and diluent gases, e.g. steam and nitrogen (if the reaction was conducted using added oxygen or air) plus significant amounts of carbon dioxide, carbon monoxide, phthalimide, and o-tolunitrile. This mixture is contacted, after being withdrawn from the reactor, with a suitable dehydration catalyst as described below, at a temperature of from about 450° F. to about 950° F., during which the phthalimide is selectively converted to additional phthalonitrile. The total phthalonitrile product can then be recovered by conventional means.

The reaction of phthalimide with a dehydration catalyst to produce phthalonitrile is not new per se; it is mentioned, for example, in U.S. Patents 2,203,861; 2,149,280; 2,100,401 and 2,054,088, and in British Patent 526,234. Swiss Patents 180,575 and 181,439 describe the conversion of 1,2- and 2,3-naphthimide respectively, into the corresponding dicyanonaphthalenes. However, it is not apparent from these references that the reaction can be utilized for the purpose of converting a minor portion of phthalimide in a mixture which also includes, e.g. phthalonitrile o-tolunitrile and ortho-xylene, to phthalonitrile, or that such a reaction can be used for conversion of the imides such as those of pyromellitic acid.

As pointed out in British Patent 526,234, not all dehydration catalysts are suitable in this process. For example, carbon, which is a catalyst for removing water from alcohols, would react ammonia and phthalimide to produce predominantly liquid by-products and only a small amount of phthalonitrile.

In the present process, the preferred catalysts are Group III metal phosphates such as aluminum and gallium phosphate. Particularly preferred is boron phosphate. Also suitable are catalysts such as supported alumina, thoria, silica, basic aluminum sulfate, and aluminum arsenate and arsenite, which are known catalysts for this reaction.

More specifically, to convert phthalimide to phthalonitrile, the products from the nitrile-producing reaction are passed into a second reactor containing boron phosphate or another of the catalysts mentioned above. The reaction is conducted at temperatures in the range of 450 to 950° F., preferably 600° to 900° F., for from about 1 to about 10 seconds. The temperature and residence time can be adjusted within these ranges to achieve the desired conversion. The temperature of the nitrile reaction products may have to be adjusted to within the above range. In most cases, the ammonia already contained in the nitrile reaction products will be sufficient to convert substantially all the phthalimide to phthalonitrile (or other imides to the corresponding nitriles), particularly if a catalyst and/or reaction conditions which result in decreased imide formation are used in the nitrile production step. In some cases, however, it may be necessary to introduce additional ammonia to convert the imide to nitrile.

The following example is presented to illustrate the operation of the invention:

A mixture of 1 part of phthalimide and 10 parts of m-tolunitrile together with 2 parts of ammonia was contacted at 400° C. with a catalyst comprising boron phosphate supported on alumina. The reactor effluent was condensed at 0° C. and analyzed by gas chromotography. Based on the analysis, it was estimated that approximately 60 percent of the phthalimide was converted to phthalonitrile.

While the above constitutes a description of the invention, it by no means is all-inclusive. Certainly, minor modifications, improvements and variations will be obvious to those skilled in this art. The invention, therefore, is only to be construed as defined in the appended claims which follow.

What is claimed is:

1. A process for producing an aromatic polynitrile containing at least one pair of nitrile groups in the ortho position relative to each other from a corresponding aromatic imide comprising contacting the imide with ammonia in the presence of boron phosphate at a temperature of 450° to 950° F. for 1 to 10 seconds.

2. A process according to claim 1 wherein the boron phosphate is supported on alumina.

3. In a process of producing an aromatic polynitrile containing at least one pair of nitrile groups in the ortho position relative to each other by reaction of a loweralkyl aromatic hydrocarbon with ammonia in the presence of a catalyst, and wherein the product of the reaction contains one or more aromatic imides with or without other side products, the improvement comprising contacting the product of the reaction with boron phosphate at a temperature of 450° F. to 950° F. for 1 to 10 seconds to convert the imides to the corresponding polynitriles.

4. A process for treating a mixture comprising phthalonitrile and phthalimide to convert the phthalimide to phthalonitrile comprising contacting the mixture with boron phosphate in the presence of ammonia at a temperature of 450° to 950° F. for 1 to 10 seconds.

References Cited
UNITED STATES PATENTS

| | | | |
|---|---|---|---|
| 2,149,280 | 3/1939 | Deem et al. | 260—465 |
| 3,312,710 | 4/1967 | Sakugama et al. | 260—465 X |

LEWIS GOTTS, Primary Examiner

D. H. TORRENCE, Assistant Examiner

U.S. Cl. X.R.

260—465 C